(12) United States Patent
Ikuma et al.

(10) Patent No.: US 9,902,820 B2
(45) Date of Patent: Feb. 27, 2018

(54) MOLDED BODY AND METHOD FOR PRODUCING CELLULOSE-NANOFIBER-CONTAINING RESIN COMPOSITION

(71) Applicant: DIC Corporation, Tokyo (JP)

(72) Inventors: Takahito Ikuma, Sakura (JP); Tetsuya Harada, Sakura (JP); Mitsuyuki Kanzaki, Takaishi (JP)

(73) Assignee: DIC Corporation, Tokyo (JP)

( * ) Notice: Subject to any disclaimer, the term of this patent is extended or adjusted under 35 U.S.C. 154(b) by 92 days.

(21) Appl. No.: 15/025,910

(22) PCT Filed: May 20, 2014

(86) PCT No.: PCT/JP2014/063304
§ 371 (c)(1),
(2) Date: Mar. 30, 2016

(87) PCT Pub. No.: WO2015/049894
PCT Pub. Date: Apr. 9, 2015

(65) Prior Publication Data
US 2016/0237229 A1    Aug. 18, 2016

(30) Foreign Application Priority Data
Oct. 2, 2013 (JP) ................... 2013-207476

(51) Int. Cl.
| | |
|---|---|
| *C08L 97/02* | (2006.01) |
| *C08J 5/06* | (2006.01) |
| *C08F 251/02* | (2006.01) |
| *C08F 299/06* | (2006.01) |
| *C08L 1/02* | (2006.01) |
| *C08J 5/00* | (2006.01) |
| *C08J 3/20* | (2006.01) |
| *C08L 1/08* | (2006.01) |
| *C08F 220/34* | (2006.01) |

(52) U.S. Cl.
CPC ............... *C08J 5/06* (2013.01); *C08F 251/02* (2013.01); *C08F 299/06* (2013.01); *C08J 3/20* (2013.01); *C08J 5/005* (2013.01); *C08L 1/02* (2013.01); *C08L 1/08* (2013.01); *C08F 2220/343* (2013.01); *C08J 2301/08* (2013.01); *C08J 2375/16* (2013.01); *C08J 2401/08* (2013.01); *C08J 2467/02* (2013.01); *C08J 2475/16* (2013.01); *C08L 2201/06* (2013.01); *C08L 2205/03* (2013.01); *C08L 2205/16* (2013.01)

(58) Field of Classification Search
CPC ... C08J 5/06; C08J 3/20; C08J 2301/08; C08J 2467/02; C08J 2475/16; C08J 2375/16; C08J 2401/08; C08L 1/08; C08L 2201/06; C08L 2205/03; C08L 2205/16
USPC .......................................................... 524/14
See application file for complete search history.

(56) References Cited

U.S. PATENT DOCUMENTS

| | | | |
|---|---|---|---|
| 2011/0263756 A1* | 10/2011 | Yano ...................... | C08J 5/045 524/13 |
| 2013/0025920 A1 | 1/2013 | Shimizu et al. | |
| 2013/0289170 A1 | 10/2013 | Takizawa et al. | |
| 2014/0073776 A1 | 3/2014 | Shiramizu et al. | |

FOREIGN PATENT DOCUMENTS

| | | |
|---|---|---|
| JP | 2005-042283 A | 2/2005 |
| JP | 2009-261993 A | 11/2009 |
| JP | 2013-116928 A | 6/2013 |
| WO | WO-2012/043558 A1 | 4/2012 |

OTHER PUBLICATIONS

International Search Report dated Aug. 26, 2014, issued for PCT/JP2014/063304.

* cited by examiner

*Primary Examiner* — Hui H Chin
(74) *Attorney, Agent, or Firm* — Locke Lord LLP

(57) ABSTRACT

Provided herein is a cellulose nanofiber-containing composition producing method for producing a cellulose nanofiber-containing composition that can be easily combined with compounds having a reactive double-bond group, and that contains only a small amount of uncured material that acts as a plasticizer in a molded product, using a simple producing method that does not require any process involving solvent displacement or solvent removal. A high-strength molded body prepared by using the cellulose nanofiber-containing composition is also provided. In refining cellulose in a mixture containing a compound having a reactive double-bond group and a hydroxyl group of 10 KOHmg/g or less and a defibrating resin as essential components, the cellulose has a moisture content of 4 to 25 parts by mass with respect to 100 parts by mass of the amount of the cellulose converted on the assumption that the percentage moisture of the cellulose is 0%.

6 Claims, No Drawings

MOLDED BODY AND METHOD FOR PRODUCING CELLULOSE-NANOFIBER-CONTAINING RESIN COMPOSITION

CROSS REFERENCE TO RELATED APPLICATIONS

This application is related to co-pending application: "MOLDED BODY AND METHOD FOR PRODUCING CELLULOSE-NANOFIBER-CONTAINING COMPOSITION" filed even date herewith in the names of Takahito IKUMA, Tetsuya HARADA and Mitsuyuki KANZAKI as a national phase entry of PCT/JP2014/063303 filed May 20, 2014, which application is assigned to the assignee of the present application and is incorporated by reference herein.

TECHNICAL FIELD

The present invention relates to a method for producing a cellulose nanofiber as a high-function filler that can be combined with a compound having a reactive double-bond group and a hydroxyl value of 10 KOHmg/g or less, and to a molded body produced by molding a resin composition obtained according to the method.

BACKGROUND ART

The recently developed cellulose nanofibers are plant-derived native nanofillers, and have attracted interest as a low-specific-gravity and high-strength composite material for resins (see PTL 1).

However, at the current level of technology, cellulose, with large numbers of hydroxyl groups, needs to be defibrated in water in order to be reduced to nano-level sizes. In order to use such water-defibrated cellulose nanofibers as a composite with various resins, it is necessary to subject the product cellulose nanofibers to dehydration and solvent displacement. Further, because of its propensity to form intermolecular hydrogen bonds, cellulose tends to reaggregate during a cellulose nanofiber dehydration process, and becomes poorly dispersed in resin.

As a solution to these problems, a technique is reported that produces cellulose nanofibers by refining cellulose in an organic solvent, instead of in water (see PTL 2). Though this technique is alleged to reduce the drying cost by not using water, combining the cellulose nanofibers with resin requires dispersing cellulose in an organic solvent, and removing the organic solvent after the cellulose is reduced to nano fibrils. The technique thus still involves complicated procedures for nanofiber production.

In other words, there is a need to establish a technique with which cellulose nanofibers can be combined with various resins at lower costs and with simpler procedures.

Techniques are reported that produce cellulose nanofibers by refining cellulose in resin, without using a solvent (see PTL 3, and PTL 4). These techniques greatly reduce the difficulties in combining cellulose nanofibers with resin. The polyester resins used in PTL 3, and the acrylic resins used in PTL 4 need to be used in large amounts to refine cellulose. Because these polyester and acrylic resins are used in large amounts, the resins are not reactive in curing of a resin having a reactive double-bond group. These resins thus remain as uncured material in a molded body, and act as a plasticizer to deteriorate the quality of the molded body. Because low moisture absorption is typically desired for a molded body of a compound having a reactive double-bond group, a compound having a reactive double-bond group and a hydroxyl value of 10 KOHmg/g or less is used as a monomer. However, the methods of PTL 3 and PTL 4 cannot refine cellulose with a compound having a reactive double-bond group and a hydroxyl value of 10 KOHmg/g or less.

CITATION LIST

Patent Literature

[PTL 1] JP-A-2005-042283
[PTL 2] JP-A-2009-261993
[PTL 3] WO2012/043558
[PTL 4] JP-A-2013-116928

SUMMARY OF INVENTION

Technical Problem

It is an object of the present invention to provide a cellulose nanofiber that can be easily combined with a compound having a reactive double-bond group and contains only a small amount of uncured material that acts as a plasticizer in a molded product according to a simple producing method that does not require any process involving solvent displacement or solvent removal, and to provide a high-strength, resin composition or molded body by using the cellulose nanofiber.

Solution to Problem

After extensive studies, the present inventors found that cellulose can be refined in a mixture containing a compound having a reactive double-bond group and a hydroxyl value of 10 KOHmg/g or less, and a defibrating resin as essential components, instead of in water or an organic solvent. It was also found that the cellulose nanofiber and the cellulose nanofiber-containing composition obtained by using such a method can be easily combined directly with other resins for dilution without requiring modification of cellulose or the like, and can contain considerably a smaller amount of the defibrating resin that acts as a plasticizer after molding as compated with those provided by the methods of related art.

Specifically, the present invention provides a method for producing a cellulose nanofiber-containing resin composition, including: refining cellulose in a mixture containing a compound having a reactive double-bond group and a hydroxyl value of 10 KOHmg/g or less and a defibrating resin as essential components, wherein the cellulose has a moisture content of 4 to 25 parts by mass with respect to 100 parts by mass of the amount of the cellulose converted on the assumption that the percentage moisture of the cellulose is 0%.

The present invention further provides a method for producing a cellulose nanofiber-containing resin composition, in which the defibrating resin is 10 parts by mass or more with respect to 100 parts by mass of the amount of the cellulose converted on the assumption that the percentage moisture of the cellulose is 0% and the mixture containing a compound having a reactive double-bond group and a hydroxyl value of 10 KOHmg/g or less and a defibrating resin as essential components is 40 parts by mass to 250 parts by mass with respect to 100 parts by mass of the amount of the cellulose converted on the assumption that the percentage moisture of the cellulose is 0%.

The present invention further provides a method for producing a cellulose nanofiber-containing resin composition, which further includes diluting the cellulose nanofiber-containing resin composition with a compound having a reactive double-bond group.

The present invention further provides a method for producing a cellulose nanofiber-containing resin composition, which further includes incorporating a polymerization initiator.

The present invention further provides a molded body of the cellulose nanofiber-containing resin composition produced according to the foregoing methods.

Advantageous Effects of Invention

The present invention enables refining cellulose with a cellulose nanofiber-containing resin composition producing method that includes refining cellulose in a mixture containing a compound having a reactive double-bond group and a hydroxyl value of 10 KOHmg/g or less, and a defibrating resin as essential components, wherein the cellulose has a moisture content of 4 to 25 parts by mass with respect to 100 parts by mass of the amount of the cellulose converted on the assumption that the percentage moisture of the cellulose is 0%.

A cellulose nanofiber, and a cellulose nanofiber-containing composition obtained by using such a method can easily be directly combined with other diluent resins, without requiring procedures such as solvent displacement, and removal of organic solvent. This makes it possible to easily obtain a desirable cellulose nanofiber composite resin composition.

The resin composition can directly be used to produce a molded body. Because the composition contains considerably small amounts of uncured defibrating resin that acts as a plasticizer during the curing, the quality of the product molded body does not deteriorate, and the molded body can have high strength with the effect of the cellulose nanofiber.

DESCRIPTION OF EMBODIMENTS

An embodiment of the present invention is described below in detail. Note that the descriptions of the embodiment of the present invention below are intended to be illustrative, and do not limit the invention.

[Types of Cellulose]

The cellulose nanofiber of the present invention is obtained by refining various types of cellulose. The cellulose used in the present invention may be any cellulose that can be used as a refinement material, including, for example, pulp, cotton, paper, and regenerated cellulose fibers such as rayon, cupra, polynosic, and acetate. Other examples thereof include bacterial cellulose, and cellulose derived from animals such as ascidians.

The cellulose may be one that has been chemically modified on the surface, as required.

Both wood pulp and nonwood pulp may preferably be used as pulp. Of mechanical pulps and chemical pulps, chemical pulps with smaller lignin contents are more preferred for use as wood pulp. A variety of chemical pulp, including sulfide pulp, kraft pulp, and alkali pulp may preferably used. A variety of nonwood pulp may be used, including straw, bagasse, kenaf, bamboo, reed, kozo (B. papyrifera), and flax.

Cotton is a plant extensively used to make clothing fibers, and any of raw cotton, a cotton fiber, and a cotton fabric may be used.

Paper is produced by separating and straining fibers from pulp. Used paper, such as newspaper, used milk cartons, and printed paper also may preferably be used.

The cellulose used as a refinement material may be a cellulose powder produced by disrupting cellulose into a certain particle size distribution. Examples of such products include KC Flock® (manufactured by Nippon Paper Chemicals Co., Ltd.), Ceolus® (manufactured by Asahi Kasei Chemicals Corporation), and Avicel® (manufactured by FMC).

[Refinement of Cellulose in Mixture Containing Compound Having Reactive Double-Bond Group and Hydroxyl Value of 10 KOHmg/g or Less, and Defibrating Resin as Essential Components]

Cellulose may be refined by adding cellulose to a mixture containing a compound having a reactive double-bond group and a hydroxyl value of 10 KOHmg/g or less, and a defibrating resin as essential components, and mechanically applying a shear force to the mixture. A shear force may be applied by means of, for example, an extruder (such as a bead mill, an ultrasonic homogenizer, a uniaxial extruder, and a biaxial extruder), a Banbury mixer, a grinder, or a pressure kneader. A shear force also may be applied using, for example, a known kneader, such as with two rollers. From the viewpoint of obtaining a stable shear force also for high-viscosity resins, it is preferable to use a pressure kneader.

In the present invention, the proportions of the mixture and the cellulose are such that the mixture is 40 parts by mass to 250 parts by mass with respect to 100 parts by mass of the amount of the cellulose converted on the assumption that the percentage moisture of the cellulose is 0%. When the mixture content is large, cellulose cannot defibrate as a result of the shear force not being applied. When the mixture content is small, the cellulose does not wet, and defibration does not proceed.

[Cellulose Mass Measurement Method Based on 0% Equivalent Percentage Moisture]

For moisture content measurement, about 5 g of cellulose is heated at 110° C. using the infrared moisture meter FD-720 (Kett Electric Laboratory) under the conditions of an automatic shutoff mode. Here, when the moisture content is 5%, the mass of the cellulose on the assumption that the percentage moisture of the cellulose is 0% is 95 parts by mass, with respect to 100 parts by mass of the cellulose. In the following, measurements for the mass of the cellulose converted on the assumption that the percentage moisture of the cellulose is 0% are performed according to the above method.

[Compound Having Reactive Double-Bond Group and Hydroxyl Value of 10 KOHmg/g or Less]

As used herein, "compound having a reactive double-bond group and a hydroxyl value of 10 KOHmg/g or less" refers to compounds having one or more reactive double-bond groups and a hydroxyl value of 10 KOHmg/g or less. Reactive double-bond group refers to double bond groups that are polymerizable through polymerization reactions such as anionic polymerization, cationic polymerization, and radical polymerization. Examples of such reactive double-bond groups include a vinyl group, an acryl group, and a methacryl group.

The compound having a reactive double-bond group and a hydroxyl value of 10 KOHmg/g or less may be a low-molecular to high-molecular resin. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, γ-butyrolactone (meth)acrylate, trimethylolpropane trimethacrylate, polyethylene glycol dimethacrylate, polypropylene glycol dimethacrylate, polytetramethylene glycol dimethacrylate, ditrimethylolpropane tetraacrylate, dipentaerythritol pentaacrylate and hexaacrylate, phenol EO-modified acrylate, trimethylolpropane EO-modified triacrylate, trimethylolpropane PO-modified triacrylate, bisphenol F EO-modified (n≈2) diacrylate, bisphenol F PO-modified (n≈2) diacrylate, pentaerythritol triacrylate and tetraacrylate, ditrimethylolpropane tetraacrylate, vinyl acetate, vinyl chloroacetate, vinyl propionate, vinyl butyrate, vinyl methoxyacetate, and vinyl benzoate, dimethyl maleate, diethyl maleate, dibutyl maleate, dimethyl fumarate, diethyl fumarate, dibutyl fumarate, dimethyl itaconate, diethyl itaconate, dibutyl itaconate, (meth)acrylamide, N-methyl (meth)acrylamide, N-ethyl (meth)acrylamide, N-propyl (meth)acrylamide, N-isopropyl (meth)acrylamide, N-n-butylacryl(meth)amide, N-t-butyl (meth)acrylamide, N-cyclohexyl (meth)acrylamide, N-(2-methoxyethyl)(meth)acrylamide, N,N-dimethyl (meth)acrylamide, N,N-diethyl (meth)acrylamide, N-phenyl (meth)acrylamide, N-nitrophenylacrylamide, N-ethyl-N-phenylacrylamide, N-benzyl (meth)acrylamide, (meth)acryloylmorpholine, diacetoneacrylamide, N-methylolacrylamide, vinyl (meth)acrylamide, N,N-diallyl (meth)acrylamide, N-allyl (meth)acrylamide, styrene, methylstyrene, dimethylstyrene, trimethylstyrene, ethylstyrene, isopropylstyrene, butylstyrene, methoxystyrene, butoxystyrene, acetoxystyrene, chlorostyrene, dichlorostyrene, bromostyrene, chloromethylstyrene, α-methylstyrene, methyl vinyl ether, ethyl vinyl ether, 2-chloroethyl vinyl ether, propyl vinyl ether, butyl vinyl ether, hexyl vinyl ether, octyl vinyl ether, methoxyethyl vinyl ether, phenyl vinyl ether, methyl vinyl ketone, ethyl vinyl ketone, propyl vinyl ketone, phenyl vinyl ketone, ethylene, propylene, isobutylene, butadiene, isoprene, maleimide, butylmaleimide, cyclohexylmaleimide, phenylmaleimide, (meth)acrylonitrile, vinyl pyridine, N-vinyl pyrrolidone, vinyl carbazole, N-vinyl formamide, N-vinyl acetamide, N-vinyl imidazole, and vinyl caprolactone.

The resin having a reactive double-bond group may be obtained by introducing a reactive double-bond group to resins such as a polyester resin, an acrylic resin, and a urethane resin. The reactive double-bond group may be introduced by using any known conventional methods, and the method of introduction is not particularly limited.

For example, when introducing a reactive double-bond group to a polyester resin, a method may be used by which a polyester resin having a carboxyl group is reacted with glycidyl (meth)acrylate.

In the case of acrylic resin, a reactive double-bond group may be introduced by, for example, reacting an acrylic resin having a carboxyl group with glycidyl (meth)acrylate, or reacting an acrylic resin having a glycidyl group with (meth)acrylic acid.

In the case of urethane resin, a reactive double-bond group may be introduced by, for example, reacting a urethane resin having an isocyanate group with a compound having a hydroxyl group and a reactive double-bond group, such as 2-hydroxyethyl (meth)acrylate.

[Defibrating Resin]

The defibrating resin of the present invention may be any known conventional resin, provided that it is not detrimental to the effects of the present invention. Specific examples thereof include polyester resins, vinyl resins, and modified epoxy resins.

[Polyester Resin]

The polyester resin in the present invention refers to polyester resins obtained by the reaction of one or more kinds of polyols represented by the following general formula (2) and one or more kinds of polycarboxylic acids represented by the following general formula (3).

$$X-(OH)_m \quad (2)$$

[In the formula, X represents a C1 to C20 aliphatic hydrocarbon group that may contain an oxygen atom, or an optionally substituted aromatic group or heterocyclic aromatic group, and m represents an integer of 2 to 4.]

$$Y-(COOH)_n \quad (3)$$

[In the formula, Y represents a C1 to C20 aliphatic hydrocarbon group, or an optionally substituted aromatic group or heterocyclic aromatic group, and n represents an integer of 2 to 4.]

Examples of the polyols represented by general formula (2) include ethylene glycol, propylene glycol, 1,3-butanediol, 1,4-butanediol, pentyl glycol, neopentyl glycol, 1,5-pentanediol, 1,6-hexanediol, 1,7-heptanediol, 1,8-octanediol, 1,9-nonanediol, 1,10-decanediol, 1,11-undecanediol, 1,12-dodecanediol, diethylene glycol, triethylene glycol, tetraethylene glycol, polyethylene glycol, dipropylene glycol, polypropylene glycol, 2-methyl-1,3-propanediol, 2-butyl-2-ethyl-1,3-propanediol, 2-methyl-1,4-butanediol, 2-ethyl-1,4-butanediol, 2-methyl-1,3-propanediol, 3-methyl-1,5-pentanediol, 3-methyl-1,5-heptanediol, hydrogenated bisphenol A, an adduct of bisphenol A and propylene oxide or ethylene oxide, 1,2,3,4-tetrahydroxybutane, glycerine, trimethylolpropane, 1,3-propanediol, 1,2-cyclohexaneglycol, 1,3-cyclohexaneglycol, 1,4-cyclohexaneglycol, 1,4-cyclohexane dimethanol, p-xylene glycol, bicyclohexyl-4,4'-diol, 2,6-decalin glycol, 2,7-decalin glycol, ethylene glycol carbonate, glycerine, trimethylolpropane, and pentaerythritol.

Examples of the polycarboxylic acids represented by general formula (3) include unsaturated dibasic acids and anhydrides thereof, such as maleic acid, maleic acid anhydrides, fumaric acid, itaconic acid, citraconic acid, chloromaleic acid, and esters thereof. Examples thereof include α, β-unsaturated dibasic acids such as halogenated maleic acid anhydrides, and aconitic acid; and β, γ-unsaturated dibasic acids such as dihydromuconic acid. Saturated dibasic acids or anhydrides thereof also may be used, including, for example, phthalic acid, phthalic anhydrides, halogenated phthalic anhydrides, isophthalic acid, terephthalic acid, nitrophthalic acid, tetrahydrophthalic acid, tetrahydrophthalic anhydrides, endo methylenetetrahydrophthalic anhydrides, halogenated phthalic anhydrides, and esters thereof. Examples thereof include hexahydrophthalic acid, hexahydrophthalic anhydrides, hexahydroterephthalic acid, hexahydroisophthalic acid, 1,4-cyclohexane dicarboxylic acid, 1,3-cyclohexane dicarboxylic acid, methylhexahydrophthalic acid, HET acid, 1,1-cyclobutanedicarboxylic acid, oxalic acid, succinic acid, succinic acid anhydrides, malonic acid, glutaric acid, adipic acid, azelaic acid, pimelic acid, suberic acid, azelaic acid, sebacic acid, 1,12-dodecane dioic acid, 2,6-naphthalene dicarboxylic acid, 2,7-naphthalene dicarboxylic acid, 2,3-naphthalene dicarboxylic acid, 2,3-naphthalene dicarboxylic acid anhydrides, 4, 4'-biphenyl dicarboxylic acid, and dialkyl esters thereof.

In addition to the polyols and the polycarboxylic acids, it is also possible to use monohydric alcohols, monocarboxylic acids, and hydroxycarboxylic acids to such an extent that these are substantially not detrimental to the properties. Examples of the monohydric alcohols include methanol, ethanol, propanol, isopropanol, butanol, isobutanol, 2-butanol, 3-butanol, n-amylalcohol, n-hexanol, isohexanol, n-heptanol, isoheptanol, n-octanol, 2-ethylhexanol, isooctanol, n-nonanol, isononanol, n-decanol, isodecanol, isoundecanol, lauryl alcohol, cetyl alcohol, decyl alcohol, undecyl alcohol, tridecyl alcohol, benzyl alcohol, and stearyl alcohol. These may be used alone or in a combination of two or more. Examples of the monocarboxylic acids include benzoic acid, heptanoic acid, nonanoic acid, caprylic acid, nonanoic acid, capric acid, undecylic acid, and lauric acid. These may be used alone or in a combination of two or more. Examples of the hydroxycarboxylic acids include lactic acid, glycolic acid, 2-hydroxy-n-butyric acid, 2-hydroxycaproic acid, 2-hydroxy 3,3-dimethylbutyric acid, 2-hydroxy-3-methylbutyric acid, 2-hydroxyisocaproic acid, and p-hydroxybenzoic acid. These may be used alone or in a combination of two or more.

The polyester resin in the present invention may be a modified polyester resin obtained by modifying polyester resins such as above. Examples of such modified polyester resins include a urethane-modified polyester, an acryl-modified polyester, an epoxy-modified polyester, and a silicone-modified polyester.

The polyester resin in the present invention may be a linear or a highly branched polyester.

The polyester resin in the present invention has an ester group concentration of preferably 6.0 mmol/g or more, more preferably 6.0 to 14 mmol/g, further preferably 6.0 to 20 mmol/g, particularly preferably 6.0 to 30 mmol/g. Preferably, the polyester resin has an ester group concentration of 6.0 mmol/g or more, and an acid value of 10 KOHmg/g or more, more preferably 10 to 100 KOHmg/g, further preferably 10 to 200 KOHmg/g, particularly preferably 10 to 300 KOHmg/g. Preferably, the polyester resin has an ester group concentration of 6.0 mmol/g or more, and a hydroxyl value of 10 or more, more preferably a hydroxyl value of 10 to 500 KOHmg/g, further preferably 10 to 800 KOHmg/g, particularly preferably 10 to 1,000 KOHmg/g. It is particularly preferable that the polyester resin in the present invention has an ester group concentration of 6.0 mmol/g or more, an acid value of 10 KOHmg/g or more, and a hydroxyl value of 10 KOHmg/g or more.

In the present invention, the polyester resin may be used alone or in a combination of two or more.

[Vinyl Resin]

The vinyl resin in the present invention is a polymer or a copolymer of a vinyl monomer. The vinyl monomer is not particularly limited. Preferred examples thereof include (meth)acrylic acid ester derivatives, vinyl ester derivatives, maleic acid diester derivatives, (meth)acrylamide) acrylamide derivatives, styrene derivatives, vinyl ether derivatives, vinyl ketone derivatives, olefin derivatives, maleimide derivatives, and (meth)acrylonitrile. Particularly preferred as the vinyl resin is a (meth)acrylic resin obtained by polymerizing (meth)acrylic acid ester derivatives.

Preferred examples of the vinyl monomers are described below. Examples of the (meth)acrylic acid ester derivatives include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 2-methoxyethyl (meth)acrylate, 2-ethoxyethyl (meth)acrylate, 2-(2-methoxyethoxy)ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, and γ-butyrolactone (meth)acrylate.

Examples of the vinyl ester derivatives include vinyl acetate, vinyl chloroacetate, vinyl propionate, vinyl butyrate, vinyl methoxyacetate, and vinyl benzoate.

Examples of the maleic acid diester derivatives include dimethyl maleate, diethyl maleate, and dibutyl maleate.

Examples of the fumaric acid diester derivatives include dimethyl fumarate, diethyl fumarate, and dibutyl fumarate.

Examples of the itaconic acid diester derivatives include dimethyl itaconate, diethyl itaconate, and dibutyl itaconate.

Examples of the (meth)acrylamide derivatives include (meth)acrylamide, N-methyl (meth)acrylamide, N-ethyl (meth)acrylamide, N-propyl (meth)acrylamide, N-isopropyl (meth)acrylamide, N-n-butylacryl (meth)amide, N-t-butyl (meth)acrylamide, N-cyclohexyl (meth)acrylamide, N-(2-methoxyethyl) (meth)acrylamide, N,N-dimethyl (meth)acrylamide, N,N-diethyl (meth)acrylamide, N-phenyl (meth)acrylamide, N-nitrophenyl acrylamide, N-ethyl-N-phenyl acrylamide, N-benzyl (meth)acrylamide, (meth)acryloylmorpholine, diacetoneacrylamide, N-methylolacrylamide, N-hydroxyethylacrylamide, vinyl (meth)acrylamide, N,N-diallyl (meth)acrylamide, and N-allyl (meth)acrylamide.

Examples of the styrene derivatives include styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, and α-methylstyrene.

Examples of the vinyl ether derivatives include methyl vinyl ether, ethyl vinyl ether, 2-chloroethyl vinyl ether, hydroxyethyl vinyl ether, propyl vinyl ether, butyl vinyl ether, hexyl vinyl ether, octyl vinyl ether, methoxyethyl vinyl ether, and phenyl vinyl ether.

Examples of the vinyl ketone derivatives include methyl vinyl ketone, ethyl vinyl ketone, propyl vinyl ketone, and phenyl vinyl ketone.

Examples of the olefin derivatives include ethylene, propylene, isobutylene, butadiene, and isoprene.

Examples of the maleimide derivatives include maleimide, butylmaleimide, cyclohexylmaleimide, and phenylmaleimide.

It is also possible to use, for example, (meth)acrylonitrile, vinyl-substituted heterocyclic groups (for example, vinyl pyridine, N-vinyl pyrrolidone, and vinyl carbazole), N-vinyl formamide, N-vinyl acetamide, N-vinyl imidazole, and vinyl caprolactone.

[Functional Group]

Preferably, the vinyl resin in the present invention has a functional group. A functional group can interact with a diluting resin, and improve the mechanical and other physical properties of a molded body. Specific examples of the functional group include halogen groups (fluorine, chlorine), hydroxyl groups, carboxyl groups, amino groups, silanol groups, and cyano groups. The vinyl resin may have more than one of these functional groups.

The vinyl resin may be obtained by heating the vinyl monomer in a reaction vessel in the presence of a polymerization initiator, optionally with aging. The reaction may be performed at 30 to 150° C., preferably 60 to 120° C., though the reaction conditions depend on, for example, the polymerization initiator and the solvent. Polymerization may be performed in the presence of an unreactive solvent.

Examples of the polymerization initiator include peroxides such as t-butyl peroxybenzoate, di-t-butyl peroxide, cumene perhydroxide, acetyl peroxide, benzoyl peroxide, and lauroyl peroxide; and azo compounds such as azobisisobutylnitrile, azobis-2,4-dimethylvaleronitrile, and azobiscyclohexanecarbonitrile.

Examples of the unreactive solvent include aliphatic hydrocarbon solvents such as hexane, and mineral sprits; aromatic hydrocarbon solvents such as benzene, toluene, and xylene; ester solvents such as butyl acetate; alcohol solvents such as methanol, and butanol; and aprotic polar solvents such as dimethylformamide, dimethylsulfoxide, and N-methylpyrrolidone. These solvents may be used alone or in a combination of two or more.

The vinyl resin of the present invention may be a linear polymer or a branched polymer. In the case of a branched polymer, the vinyl resin may have a form of a comb or a star.

[Molecular Weight]

The vinyl resin used in the present invention has a weight-average molecular weight of preferably 6,000 or less. Though details remain unclear, it is believed that affinity to cellulose fibers increases with a weight-average molecular weight of 6,000 or less.

[Acid Value]

When the vinyl resin of the present invention has a weight-average molecular weight of 6,000 or less, the acid value is preferably 30 KOHmg/g or more and less than 60 KOHmg/g.

[Hydroxyl Value]

When the vinyl resin of the present invention has a weight-average molecular weight of 6,000 or less, the hydroxyl value is preferably 30 KOHmg/g or more, more preferably 50 KOHmg/g or more.

When the vinyl resin of the present invention has a weight-average molecular weight of 6,000 or less, it is particularly preferable that the acid value is 30 KOHmg/g or more and less than 60 KOHmg/g, and that the hydroxyl value is 30 KOHmg/g or more.

[Modified Epoxy Resin]

The modified epoxy resin in the present invention is a modified epoxy resin having an epoxy group and a hydroxyl value of 100 mgKOH/g or more.

The modified epoxy resin may be obtained by the reaction of an epoxy resin with a compound having a carboxyl group or an amino group.

[Epoxy Resin]

The epoxy resin used in the present invention is a compound having an epoxy group within the molecule, and the structure and other properties are not particularly limited, as long as it generates a modified epoxy resin having a hydroxyl value of 100 mgKOH/g or more through reaction with a compound having a carboxyl group or an amino group (described later). Examples thereof include polyepoxy resins such as a bisphenol A epoxy resin, a bisphenol F epoxy resin, a bisphenol AD epoxy resin, a bisphenol S epoxy resin, a phenol novolac epoxy resin, a cresol novolac epoxy resin, a p-tert-butylphenol novolac epoxy resin, a nonylphenol novolac epoxy resin, and a t-butyl catechol epoxy resin. The epoxy resin also may be a monoepoxy resin, for example, such as a condensation product of epihalohydrin with aliphatic alcohols (e.g., butanol), C11 to C12 aliphatic alcohols, and monophenols (such as phenol, p-ethylphenol, o-cresol, m-cresol, p-cresol, p-t-butylphenol, s-butylphenol, nonylphenol, and xylenol), and a condensation product of epihalohydrin with monocarboxyl groups such as neodecanoic acid. Other examples thereof include glycidylamines such as a condensation product of diaminodiphenylmethane and epihalohydrin; and polyaliphatic epoxy resins, for example, such as polyglycidyl ethers of vegetable oils such as a soy oil, and a castor oil. The epoxy resin also may be a polyalkylene glycol epoxy resin, for example, such as a condensation product of epihalohydrin with ethylene glycol, propylene glycol, 1,4-butanediol, 1,6-hexanediol, glycerine, erythritol, polyethylene glycol, polypropylene glycol, polytetramethylene ether glycol, or trimethylolpropane. Other examples thereof include the aqueous epoxy resins described in JP-A-2005-239928. These may be used alone or in a combination of two or more.

The epoxy resin may be a liquefied low-viscosity epoxy resin obtained after adding an organic solvent, an unreactive diluent, or the like, as required.

[Compound Having Carboxyl Group or Amino Group]

The compound having a carboxyl group or an amino group in the present invention is a compound that reacts with the epoxy resin to generate a modified epoxy resin having a hydroxyl value of 100 mgKOH/g or more, and may be at least one of a compound having a carboxyl group, a compound having an amino group, and a compound having a carboxyl group and an amino group.

A compound having a hydroxyl group in addition to a carboxyl group or an amino group is particularly preferred because such compounds can impart a high hydroxy value to the modified epoxy resin upon reacting with the epoxy compound.

[Compound Having Carboxyl Group]

The compound having a carboxyl group in the present invention is a compound having one or more carboxyl groups. Specific examples of the compound having one carboxyl group include fatty acids such as formic acid, acetic acid, propionic acid, butanoic acid, pentanoic acid, hexanoic acid, heptanoic acid, octanoic acid, nonanoic acid, decanoic acid, chloroacetic acid, trifluoroacetic acid, isopropyl acid, isostearic acid, and neodecanoic acid; and aromatic carboxylic acids such as benzoic acid, methylbenzoic acid, dimethylbenzoic acid, trimethylbenzoic acid, phenylacetic acid, 4-isopropylbenzoic acid, 2-phenylpropane acid, 2-phenylacrylic acid, 3-phenylpropane acid, and cinnamic acid. Specific examples of the compound having two or more carboxyl groups include carboxylic acids such as succinic acid, adipic acid, terephthalic acid, isophthalic acid, and pyromellitic acid, and anhydrides thereof. Other examples thereof include maleic acid, maleic acid anhydrides, fumaric acid, itaconic acid, citraconic acid, chloromaleic acid, and esters thereof; halogenated maleic acid anhydrides, α, β-unsaturated dibasic acids such as aconitic acid, and β, γ-unsaturated dibasic acids such as dihydromuconic acid. Other examples thereof include saturated dibasic acids and anhydrides thereof, for example, such as phthalic acid, phthalic anhydrides, halogenated phthalic anhydrides, isophthalic acid, terephthalic acid, nitrophthalic acid, tetrahydrophthalic acid, tetrahydrophthalic anhydrides, endomethylene tetrahydrophthalic anhydrides, halogenated phthalic anhydrides, and esters thereof. Examples thereof include hexahydrophthalic acid, hexahydrophthalic anhydrides, hexahydroterephthalic acid, hexahydroisophthalic acid, 1,4-cyclohexane dicarboxylic acid, 1,3-cyclohexane dicarboxylic acid, methylhexahydrophthalic acid, HET acid, 1,1-cyclobutanedicarboxylic acid, oxalic acid, succinic acid, succinic acid anhydrides, malonic acid, glutaric acid, adipic acid, azelaic acid, pimelic acid, suberic acid, azelaic acid, sebacic acid, 1,12-dodecane dioic acid, 2,6-naphthalene dicarboxylic acid, 2,7-naphthalene dicarboxylic acid, 2,3-naphthalene dicarboxylic acid, 2,3-naphthalene dicarboxylic acid anhydrides, and 4,4'-biphenyl dicarboxylic acid.

[Compound Having Amino Group]

The compound having an amino group in the present invention is a compound having one or more amino groups. Specific examples of the compound having one amino group include methylamine, ethylamine, dimethylamine, diethylamine, propylamine, butylamine, N,N-dimethyl-2-propaneamine, aniline, toluidine, and 2-aminoanthracene. Examples of the compound having two or more amino groups include ethylenediamine, 1,3-propanediamine, 1,4-butanediamine, 1,6-hexamethylenediamine, 1,4-cyclohexanediamine, 3-aminomethyl-3,5,5-trimethylcyclohexylamine, piperazine, 2,5-dimethylpiperazine, isophoronediamine, 4,4'-cyclohexylmethanediamine, norbornanediamine, hydrazine, diethylenetriamine, triethylenetriamine, 1,3-bis(aminomethyl)cyclohexane, and xylylenediamine.

[Compound Having Carboxyl Group and Amino Group]

The compound having a carboxyl group and an amino group in the present invention is a compound having one or more carboxyl groups and one or more amino groups. Typical examples thereof include amino acids, and the compound having a carboxyl group and an amino group may further contain a hydroxyl group. Specific examples thereof include alanine, arginine, asparagine, asparagine acid, cysteine, glutamine, glutamic acid, glycine, histidine, isoleucine, leucine, lycine, methionine, phenylalanine, proline, serine, threonine, tryptophan, tyrosine, valine, amino butyric acid, theanine, tricholomic acid, and kainic acid.

[Compound Having Carboxyl Group or Amino Group with Hydroxyl Group]

The compound having a carboxyl group or an amino group with a hydroxyl group is a compound having a carboxyl group or an amino group, and one or more hydroxyl groups. Specific examples thereof include glycolic acid, glyceric acid, hydroxypropionic acid, hydroxybutyric, malic acid, 2,3-dihydroxybutanedioic acid, citric acid, isocitric acid, mevalonic acid, pantoic acid, ricinolic acid, dimethylolpropionic acid, dimethylolbutanoic acid, hydroxyphenylpropane acid, mandelic acid, benzilic acid, hydroxymethylamine, hydroxyethylamine, and hydroxypropylamine.

[Production of Modified Epoxy Resin]

The modified epoxy resin having a hydroxyl value of 100 mgKOH/g or more in the present invention may be obtained through reaction of the epoxy group of the epoxy resin with the carboxyl group or the amino group of the compound having a carboxyl group or an amino group. A hydroxyl value of less than 100 mgKOH/g is not preferable because it lowers the affinity to the cellulose, and makes it difficult to defibrate the cellulose into cellulose nanofibers. The reaction between the epoxy group and the carboxyl group or the amino group may have any reaction ratio, provided that the reaction produces a hydroxyl value of 100 mgKOH/g or more, and that the product contains the desired amount of epoxy group.

The number of epoxy groups in the modified epoxy resin is preferably 0.3 or more, more preferably 0.5 or more, most preferably 1 or more per molecule.

The modified epoxy resin may be produced with or without a solvent. Preferably, the reaction is solvent-free to eliminate the need to remove the solvent. The polymerization solvent is not particularly limited. Examples thereof include methanol, ethanol, isopropanol, 1-butanol, tertiary butanol, isobutanol, diacetone alcohol, acetone, methyl ethyl ketone, diethyl ketone, methyl isobutyl ketone, cyclohexanone, dibutyl ether, tetrahydrofuran, dioxane, ethylene glycol monomethyl ether, diethylene glycol monomethyl ether, diethylene glycol monoethyl ether, diethylene glycol diethyl ether, butyl cellosolve, toluene, xylene, ethyl acetate, and isobutyl acetate. These solvents may be used alone or as a mixture.

Lewis acid catalysts or Lewis base catalysts may be used as reaction catalysts. Specific examples thereof include boron trifluoride, benzyltrimethylammonium chloride, dimethylaminopyridine, pyridine, 8-diazabicyclo[5.4.0]undec-7-ene, and triphenylphosphine.

The reaction temperature is preferably from room temperature to 200° C.

In the present invention, the defibrating resin may be used alone, or more than one defibrating resin may be used in combination.

In the present invention, the proportions of the defibrating resin and cellulose are such that the defibrating resin is preferably 10 parts by mass or more with respect to 100 parts by mass of the amount of the cellulose converted on the assumption that the percentage moisture of the cellulose is 0%. With 10 parts by mass or more of defibrating resin, the wettability between cellulose and the mixture containing a compound having a reactive double-bond group and a hydroxyl value of 10 KOHmg/g or less, and a defibrating resin as essential components improves, and promotes cellulose refinement.

In the present invention, it is preferable to add a polymerization inhibitor in order that the compound having a reactive double-bond group and a hydroxyl value of 10 KOHmg/g or less does not polymerize during defibration.

The polymerization inhibitor is not particularly limited, and may be, for example, methoquinone, hydroquinone, t-butylhydroquinone, or 4-t-butyl catechol.

In the present invention, the moisture content is preferably 4 to 25 parts by mass with respect to 100 parts by mass of the amount of the cellulose converted on the assumption that the percentage moisture of the cellulose is 0%. As used herein, "moisture content" is inclusive of the original moisture content of the cellulose. When the moisture content is less than 4 parts by mass, the cellulose aggregates and hardens, and fails to defibrate. When it is above 25 parts by mass, the cellulose is unable to absorb all moisture, and the mixture containing a compound having a reactive double-bond group and a hydroxyl value of 10 KOHmg/g or less, and a defibrating resin as essential components fails to defibrate as it emulsifies.

The refining method of the present invention refines cellulose into cellulose nanofibers. The refining method of the present invention enables refining cellulose into, for example, a length of 100 nm to 1,000,000 nm along the long axis direction, and a length of 5 nm to 1,000 nm along the short axis direction.

A resin composition suited for molding may be obtained by diluting the cellulose nanofiber-containing resin composition obtained by using the producing method, with a compound having a reactive double-bond group.

When diluting the cellulose nanofiber-containing resin composition with a compound having a reactive double-bond group, the cellulose nanofiber-containing resin composition may be used either directly or after being dried.

[Compound Having Reactive Double-Bond Group]

As used herein, "compound having a reactive double-bond group" refers to compounds having one or more reactive double-bond groups. Reactive double-bond group refers to double bond groups that are polymerizable through polymerization reactions such as anionic polymerization, cationic polymerization, and radical polymerization. Examples of such reactive double-bond groups include a vinyl group, an acryl group, and a methacryl group.

The compound having a reactive double-bond group may be a low-molecular to high-molecular resin. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth) acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 2-methoxyethyl (meth)acrylate, 2-ethoxyethyl (meth)acrylate, 2-(2-methoxyethoxy)ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth) acrylate, tribromophenyl (meth)acrylate, tribromophenyloxyethyl (meth)acrylate, γ-butyrolactone (meth)acrylate, glyceryl monomethacrylate, glyceryl dimethacrylate, trimethylolpropane trimethacrylate, polyethylene glycol dimethacrylate, polypropylene glycol dimethacrylate, polytetramethylene glycol dimethacrylate, ditrimethylolpropane tetraacrylate, dipentaerythritol pentaacrylate and hexaacrylate, phenol EO modified acrylate, trimethylolpropane EO-modified triacrylate, trimethylolpropane PO-modified triacrylate, bisphenol F EO-modified (n≈2)diacrylate, bisphenol F PO-modified (n≈2)diacrylate, pentaerythritol triacrylate and tetraacrylate, ditrimethylolpropane tetraacrylate, vinyl acetate, vinyl chloroacetate, vinyl propionate, vinyl butyrate, vinyl methoxyacetate, and vinyl benzoate , dimethyl maleate, diethyl maleate, dibutyl maleate, dimethyl fumarate, diethyl fumarate, dibutyl fumarate, dimethyl itaconate, diethyl itaconate, dibutyl itaconate, (meth)acrylamide, N-methyl (meth)acrylamide, N-ethyl (meth)acrylamide, N-propyl (meth)acrylamide, N-isopropyl (meth)acrylamide, N-n-butylacryl(meth)amide, N-t-butyl (meth) acrylamide, N-cyclohexyl (meth)acrylamide, N-(2-methoxyethyl)(meth)acrylamide, N,N-dimethyl (meth) acrylamide, N,N-diethyl (meth)acrylamide, N-phenyl (meth)acrylamide, N-nitrophenylacrylamide, N-ethyl-N-phenylacrylamide, N-benzyl (meth)acrylamide, (meth)acryloylmorpholine, diacetoneacrylamide, N-methylolacrylamide, N-hydroxyethylacrylamide, vinyl (meth)acrylamide, N,N-diallyl (meth)acrylamide, N-allyl (meth)acrylamide, styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, α-methylstyrene, methyl vinyl ether, ethyl vinyl ether, 2-chloroethyl vinyl ether, hydroxyethyl vinyl ether, propylvinyl ether, butylvinyl ether, hexylvinyl ether, octylvinyl ether, methoxyethyl vinyl ether, phenylvinyl ether, methylvinyl ketone, ethylvinyl ketone, propylvinyl ketone, phenylvinyl ketone, ethylene, propylene, isobutylene, butadiene, isoprene, maleimide, butylmaleimide, cyclohexylmaleimide, phenylmaleimide, (meth)acrylonitrile, vinyl pyridine, N-vinyl pyrrolidone, vinyl carbazole, N-vinyl formamide, N-vinyl acetamide, N-vinyl imidazole, and vinyl caprolactone.

The resin having a reactive double-bond group may be obtained by introducing a reactive double-bond group to resins such as a polyester resin, an acrylic resin, and a urethane resin. The reactive double-bond group may be introduced by using any known conventional methods, and the method of introduction is not particularly limited.

For example, when introducing a reactive double-bond group to a polyester resin, a method may be used by which a polyester resin having a carboxyl group is reacted with glycidyl (meth)acrylate.

In the case of acrylic resin, a reactive double-bond group may be introduced by, for example, reacting an acrylic resin having a carboxyl group with glycidyl (meth)acrylate, or reacting an acrylic resin having a glycidyl group with (meth)acrylic acid.

In the case of urethane resin, a reactive double-bond group may be introduced by, for example, reacting a urethane resin having an isocyanate group with a compound having a hydroxyl group and a reactive double-bond group, such as 2-hydroxyethyl (meth)acrylate.

The compound having a reactive double-bond group may be used alone or in a combination of two or more.

The cellulose nanofiber-containing resin composition, and the compound having a reactive double-bond group may be used in any proportions, provided that it is not detrimental to the effects of the present invention.

A polymerization initiator needs to be contained to mold the resin composition. A polymerization initiator may be contained at any timing, such as when diluting with the compound having a reactive double-bond group, after diluting with the compound having a reactive double-bond group, and immediately before molding.

The polymerization initiator may be, for example, a photopolymerization initiator, or a heat-polymerization initiator.

The photopolymerization initiator is not particularly limited. Examples thereof include 1-hydroxycyclohexyl phenyl ketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl (2-hydroxy-2-propyl)ketone, 2-methyl-1-[4-(methylthio)phenyl]-2-morpholinopropane-1, benzoin, benzoin methyl ether, benzoin ethyl ether, benzoin isopropyl ether, benzoin n-butyl ether, benzoin phenyl ether, benzyl dimethyl ketal, benzophenone, benzoylbenzoic acid, methylbenzoyl benzoate, 4-phenylbenzophenone, hydroxybenzophenone, acrylated benzophenone, 4-benzoyl-4'-methyldiphenylsulfide, 3,3'-dimethyl-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, methylphenylglyoxylate, benzyl, and camphorquinone.

Examples of the heat-polymerization initiator include peroxides such as isobutyl peroxide, cumyl peroxyneodecanate, diisopropyl peroxydicarbonate, di-2-ethylhexyl peroxydicarbonate, tert-butyl peroxyneodecanate, 3,5,5-trimethylhexanol peroxide, lauryl peroxide, 1,1,3,3,-tetramethylbutyl peroxy-2-ethylhexanate, t-hexylperoxy-2-ethylhexanate, benzoyl peroxide, t-butyl peroxymaleic acid, and t-butyl peroxybenzoate; and azo compounds such as azobisisobutylnitrile, azobis-2,4-dimethylvaleronitrile, and azobiscyclohexanecarbonitrile. The heat-polymerization initiator may be used alone or in a combination of two or more, or with a decomposition promoter such as cobalt naphthenate, and dimethylaniline.

[Other Additives]

The resin composition may contain various known additives for difference uses, provided that such addition is not detrimental to the effects of the present invention. Examples of additives include a hydrolysis preventing agent, a colorant, a fire retardant, an antioxidant, a polymerization inhibitor, an ultraviolet absorber, an antistatic agent, a lubricant, a release agent, a defoaming agent, a leveling agent, a light stabilizer (for example, such as hindered amine), an antioxidant, an inorganic filler, and an organic filler.

These additives may be added at any timing, such as before defibrating cellulose, after defibrating cellulose, during dilution with the compound having a reactive double-bond group, and after dilution with the compound having a reactive double-bond group, provided that it is not detrimental to the effects of the present invention.

[Molding Method]

The method for molding a molded body according to the resin composition of the present invention is not particularly limited. It is, however, preferable to use a method that flows the material into a mold made of materials such as FRP, resin, and glass, or a method that applies the material using a brush, a roller, a trowel, a spray, or the like.

[Use]

The resin composition of the present invention may preferably be used in a range of applications. For example, the present invention is applicable to floor materials, waterproofing materials, and road pavers in applications such as waterproofing of floors, roofs, rooftops, and walls in offices, factories, and clean rooms, waterproofing of floorboards for viaducts, and coloring, heat-shield coating, and antiskid paving of asphalt and concrete road surfaces. The invention, however, is not limited to these applications.

EXAMPLES

A form of the present invention is described below in detail. It should be noted, however, that the present invention is not limited by the following.

Synthesis Example 1

Synthesis of PPG Urethane Methacrylate

Resin 496 g of polypropylene glycol (hereinafter, simply "PPG") having a number average molecular weight of 1,000, 145 g of tolylene diisocyanate, and 33 g of isophorone diisocyanate were charged into a 1-liter four-neck flask equipped with a thermometer, an agitator, an inert gas inlet, an air inlet, and a reflux condenser, and reacted at 80° C. for 4 h under a nitrogen stream. As the NCO equivalent reached 600, a value nearly equal to the theoretical equivalent, the mixture was cooled to 50° C. After adding 0.07 g of hydroquinone and 134 g of 2-hydroxyethylmethacrylate (hereinafter, simply "HEMA"), the mixture was reacted at 90 degrees for 5 h under a stream of air. At the time when the NCO% reached 0.1% or less, 0.07 g of tert-Butyl catechol was added, and thus, a composition 1 of a urethane methacrylate resin having a number average molecular weight of 1666 was obtained. The hydroxyl value of the resin composition was measured, and was less than 1 KOHmg/g.

[Hydroxyl Value Measurement]

Terminal hydroxyl value and acid value were determined from the area ratio of peaks derived from the terminal structure and the ester bond in a 13C-NMR spectrum. By using the JEOL product JNM-LA300, 10 mg of a relaxation reagent Cr (acac) 3 was added to 10 mass % of a sample deuterated-chloroform solution, and 13C-NMR quantitative measurements were performed using the gated coupling method. The measurement was run 4,000 times.

Synthesis Example 2

Synthesis of Polyester Resin 758.2 parts of diethylene glycol (7.14 mol, charging molar ratio: 0.53), 652.6 parts of adipic acid (4.47 mol, charging molar ratio: 0.33), and 183.9 parts of maleic acid anhydride (1.88 mol, charging molar ratio: 0.14) were charged into a 2-L glass flask equipped with a nitrogen gas inlet, a reflux condenser, and an agitator, and the mixture was heated under a stream of nitrogen. A dehydrocondensation reaction was allowed at an inner temperature of 200° C., using an ordinary method. The mixture was cooled to 150° C. immediately after the acid value reached 13 KOHmg/g, and 2,6-di-tert-butyl-p-cresol was added in 100 ppm with respect to the weight of the charged raw material. The mixture was then cooled to room temperature to obtain a polyester resin 1. The product had a hydroxyl value of 78 KOHmg/g as measured in the same manner as in Synthesis Example 1.

Example 1

Cellulose Refining Method 300 g of the urethane methacrylate resin composition 1 synthesized in Synthesis Example 1, 100 g of the polyester resin 1 synthesized in Synthesis Example 2, and 0.2 g of tert-butyl catechol were mixed, and charged into a pressure kneader (DS1-5GHH-H manufactured by Moriyama Corporation). After adding 625 g of the cellulose powder product KC Flock® W-50GK (manufactured by Nippon Paper Industires Co., Ltd.) thereto, the mixture was kneaded under pressure at 60 rpm for 300 min. The above cellulose refining process produced a cellulose nanofiber-containing resin composition 1. The cellulose used had a moisture content of 4.2 parts by mass with respect to 100 parts by mass of the amount of the cellulose converted on the assumption that the percentage moisture of the cellulose is 0%.

[Determination of Refined State]

The cellulose nanofiber-containing composition 1 was suspended in acetone to make the cellulose concentration 0.5 mass o, and dispersed at 15,000 rpm for 20 min using TKhomomixer A manufactured by Tokushu Kikai Kogyo Co., Ltd. After spreading a droplet of the suspension over glass and drying acetone, the sample was micrographed 10 times in 10,000 times magnification using a scanning electron microscope. A straight line was diagonally drawn on each picture, and the fiber diameter of cellulose fibers that crossed the straight line was measured. The same measurement was performed for all 10 micrographs, and the number average fiber diameter was measured. The refined state of cellulose was determined as "Good" when the number average fiber diameter was less than 500 nm, "Acceptable" when the number average fiber diameter was 500 nm or more and less than 1,000 nm, and "Poor" when the number average fiber diameter was 1,000 nm or more. The same determination was made in Examples 2 to 5 and Comparative Examples 1 to 7.

[Percentage Moisture Measurement of Cellulose]

About 5 g of cellulose was measured at 110° C. with the Infrared Moisture Meter FD-720 (Kett Electric Laboratory) under the conditions of an automatic shutoff mode.

The same measurement was performed in Examples 2 to 5 and Comparative Examples 1 to 7.

Example 2

Cellulose Refining Method 300 g of Aronix® M-350 manufactured by Toagosei Co. Ltd. (trimethylolpropane EO-modified triacrylate, or simply "EO-TMPTA"), 100 g of the polyester resin 1 synthesized in Synthesis Example 2, and 0.2 g of tert-butyl catechol were mixed, and charged into a pressure kneader (DS1-5GHH-H manufactured by Moriyama Corporation). After adding 630 g of the cellulose powder product KC Flock® W-50GK (manufactured by Nippon Paper Industires Co., Ltd.) thereto, the mixture was kneaded under pressure at 60 rpm for 300 min. The cellulose refining process produced a cellulose nanofiber-containing resin composition 2. The cellulose used had a moisture content of 5.0 parts by mass with respect to 100 parts by mass of the amount of the cellulose converted on the assumption that the percentage moisture of the cellulose is 0%. EO-TMPTA had a hydroxyl value of less than 1 KOHmg/g as measured by using the hydroxyl value measurement method described in Synthesis Example 1.

Example 3

Cellulose Refining Method 220 g of the urethane methacrylate resin composition 1 synthesized in Synthesis Example 1, 80 g of the polyester resin 1 synthesized in Synthesis Example 2, and 0.2 g of tert-butyl catechol were mixed, and charged into a pressure kneader (DS1-5GHH-H manufactured by Moriyama Corporation). After adding 736 g of the cellulose powder product KC Flock® W-50GK (manufactured by Nippon Paper Industires Co., Ltd.) thereto, the mixture was kneaded under pressure at 60 rpm for 300 min. The cellulose refining process produced a cellulose nanofiber-containing resin composition 3. The cellulose used had a moisture content of 5.2 parts by mass with respect to 100 parts by mass of the amount of the cellulose converted on the assumption that the percentage moisture of the cellulose is 0%.

Example 4

Cellulose Refining Method 600 g of the urethane methacrylate resin composition 1 synthesized in Synthesis Example 1, 100 g of the polyester resin 1 synthesized in Synthesis Example 2, and 0.2 g of tert-butyl catechol were mixed, and charged into a pressure kneader (DS1-5GHH-H manufactured by Moriyama Corporation). After adding 316 g of the cellulose powder product KC Flock® W-50GK (manufactured by Nippon Paper Industires Co., Ltd.) thereto, the mixture was kneaded under pressure at 60 rpm for 300 min. The cellulose refining process produced a cellulose nanofiber-containing resin composition 4. The cellulose used had a moisture content of 5.4 parts by mass with respect to 100 parts by mass of the amount of the cellulose converted on the assumption that the percentage moisture of the cellulose is 0%.

Example 5

Cellulose Refining Method 300 g of the urethane methacrylate resin composition 1 synthesized in Synthesis Example 1, 100 g of the polyester resin 1 synthesized in Synthesis Example 2, and 0.2 g of tert-butyl catechol were mixed, and charged into a pressure kneader (DS1-5GHH-H manufactured by Moriyama Corporation). The kneader was then charged with 630 g of the cellulose powder product KC Flock® W-50GK (manufactured by Nippon Paper Industires Co., Ltd.). The cellulose used had a moisture content of 5.0 parts by mass with respect to 100 parts by mass of the amount of the cellulose converted on the assumption that the percentage moisture of the cellulose is 0%. After adding 120 g of water to make the moisture content 25.0 parts by mass with respect to 100 parts by mass of the amount of the cellulose converted on the assumption that the percentage moisture of the cellulose is 0%, the mixture was kneaded under pressure at 60 rpm for 300 min. The cellulose refining process produced a cellulose nanofiber-containing resin composition 5.

Comparative Example 1

Cellulose Refining Method 400 g of the urethane methacrylate resin composition 1 synthesized in Synthesis Example 1, and 0.2 g of tert-butyl catechol were mixed, and charged into a pressure kneader (DS1-5GHH-H manufactured by Moriyama Corporation). After adding 630 g of the cellulose powder product KC Flock® W-50GK (manufactured by Nippon Paper Industires Co., Ltd.) thereto, the mixture was kneaded under pressure at 60 rpm for 300 min, thereby completing the cellulose refining process. The cellulose used had a moisture content of 5.0 parts by mass with respect to 100 parts by mass of the amount of the cellulose converted on the assumption that the percentage moisture of the cellulose is 0%.

Comparative Example 2

Cellulose Refining Method 400 g of EO-TMPTA and 0.2 g of tert-butyl catechol were mixed, and charged into a pressure kneader (DS1-5GHH-H manufactured by Moriyama Corporation). After adding 629 g of the cellulose powder product KC Flock® W-50GK (manufactured by Nippon Paper Industires Co., Ltd.) thereto, the mixture was kneaded under pressure at 60 rpm for 300 min, thereby completing the cellulose refining process. The cellulose used had a moisture content of 4.9 parts by mass with respect to 100 parts by mass of the amount of the cellulose converted on the assumption that the percentage moisture of the cellulose is 0%.

Comparative Example 3

Cellulose Refining Method

The cellulose powder product KC Flock® W-50GK (manufactured by Nippon Paper Industires Co., Ltd.) was dried overnight with a 130° C. drier. The cellulose used had a moisture content of 3.2 parts by mass with respect to 100 parts by mass of the amount of the cellulose converted on the assumption that the percentage moisture of the cellulose is 0%. 300 g of the urethane methacrylate resin composition 1 synthesized in Synthesis Example 1, 100 g of the polyester resin 1 synthesized in Synthesis Example 2, and 0.2 g of tert-butyl catechol were mixed, and charged into a pressure kneader (DS1-5GHH-H manufactured by Moriyama Corporation). After adding 619 g of the dried KC Flock® W-50GK thereto, the mixture was kneaded under pressure at 60 rpm for 300 min, thereby completing the cellulose refining process.

Comparative Example 4

Cellulose Refining Method 300 g of the urethane methacrylate resin composition 1 synthesized in Synthesis Example 1, 100 g of the polyester resin 1 synthesized in Synthesis Example 2, and 0.2 g of tert-butyl catechol were mixed, and charged into a pressure kneader (DS1-5GHH-H manufactured by Moriyama Corporation). The kneader was then charged with 630 g of the cellulose powder product KC Flock® W-50GK (manufactured by Nippon Paper Industires Co., Ltd.). The cellulose used had a moisture content of 5.0 parts by mass with respect to 100 parts by mass of the amount of the cellulose converted on the assumption that the percentage moisture of the cellulose is 0%. After adding 150 g of water to make the moisture content 30.0 parts by mass with respect to 100 parts by mass of the amount of the cellulose converted on the assumption that the percentage moisture of the cellulose is 0%, the mixture was kneaded under pressure at 60 rpm for 300 min, thereby completing the cellulose refining process.

Comparative Example 5

Cellulose Refining Method 100 g of the urethane methacrylate resin composition 1 synthesized in Synthesis Example 1, 100 g of the polyester resin 1 synthesized in Synthesis Example 2, and 0.1 g of tert-butyl catechol were mixed, and charged into a pressure kneader (DS1-5GHH-H manufactured by Moriyama Corporation). After adding 837 g of the cellulose powder product KC Flock® W-50GK (manufactured by Nippon Paper Industires Co., Ltd.) thereto, the mixture was kneaded under pressure at 60 rpm for 300 min, thereby completing the cellulose refining process. The cellulose used had a moisture content of 4.6 parts by mass with respect to 100 parts by mass of the amount of the cellulose converted on the assumption that the percentage moisture of the cellulose is 0%.

Comparative Example 6

Cellulose Refining Method 500 g of the urethane methacrylate resin composition 1 synthesized in Synthesis Example 1, 250 g of the polyester resin 1 synthesized in Synthesis Example 2, and 0.4 g of tert-butyl catechol were mixed, and charged into a pressure kneader (DS1-5GHH-H manufactured by Moriyama Corporation). After adding 263 g of the cellulose powder product KC Flock® W-50GK (manufactured by Nippon Paper Industires Co., Ltd.) thereto, the mixture was kneaded under pressure at 60 rpm for 300 min, thereby completing the cellulose refining process. The cellulose used had a moisture content of 5.2 parts by mass with respect to 100 parts by mass of the amount of the cellulose converted on the assumption that the percentage moisture of the cellulose is 0%.

Comparative Example 7

Cellulose Refining Method 600 g of the polyester resin 1 synthesized in Synthesis Example 2, and 0.3 g of tert-butyl catechol were mixed, and charged into a pressure kneader (DS1-5GHH-H manufactured by Moriyama Corporation). After adding 420 g of the cellulose powder product KC Flock W-50GK (manufactured by Nippon Paper Industires Co., Ltd.) thereto, the mixture was kneaded under pressure at 60 rpm for 300 min, thereby completing the cellulose refining process. The cellulose refining process produced a cellulose nanofiber-containing composition 6. The cellulose used had a moisture content of 5.1 parts by mass with respect to 100 parts by mass of the amount of the cellulose converted on the assumption that the percentage moisture of the cellulose is 0%.

Table 1 shows the results of the determination of refined state for the cellulose samples of Examples 1 to 5 and Comparative Examples 1 to 7.

[Percentage Moisture Measurement of Cellulose Nanofiber-Containing Composition]

About 5 g of the sample was measured at 110° C. with the Infrared Moisture Meter FD-720 (manufactured by Kett Electric Laboratory) under the conditions of an automatic

TABLE 1

|  |  | EX. 1 | EX. 2 | EX. 3 | EX. 4 | EX. 5 |
|---|---|---|---|---|---|---|
| Cellulose | KC-W50GK (weight of the cellulose converted on the assumption that the percentage moisture of the cellulose is 0%) | 100 | 100 | 100 | 100 | 100 |
| Compound having reactive double-bond group and hydroxyl value of 10 KOHmg/g or less | Urethane methacrylate resin 1 of Synthesis Example 1 (hydroxyl value of less than 1 KOHmg/g) | 50.0 |  | 31.4 | 200 | 50 |
|  | EO-TMPTA (hydroxyl value of less than 1 KOHmg/g) |  | 50.0 |  |  |  |
| Defibrating resin | Polyester resin 1 of Synthesis Example 2 | 16.7 | 16.7 | 11.4 | 33.3 | 16.7 |
| Total of compound having reactive double-bond group and a hydroxyl value of 10 KOHmg/g or less, and defibrating resin | | 66.7 | 66.7 | 42.8 | 233.3 | 66.7 |
| Moisture content in the system (including the moisture in cellulose) | | 4.2 | 5.0 | 5.2 | 5.4 | 25 |
| Refined state of cellulose | | Good | Good | Good | Good | Good |

|  |  | COM. EX. 1 | COM. EX. 2 | COM. EX. 3 | COM. EX. 4 | COM. EX. 5 | COM. EX. 6 | COM. EX. 7 |
|---|---|---|---|---|---|---|---|---|
| Cellulose | KC-W50GK (weight of the cellulose converted on the assumption that the percentage moisture of the cellulose is 0%) | 100 | 100 | 100 | 100 | 100 | 100 | 100 |
| Compound having reactive double-bond group and hydroxyl value of 10 KOHmg/g or less | Urethane methacrylate resin 1 of Synthesis Example 1 (hydroxyl value of less than 1 KOHmg/g) | 66.7 |  | 50 | 50 | 16.7 | 200 |  |
|  | EO-TMPTA (hydroxyl value of less than 1 KOHmg/g) |  | 66.7 |  |  |  |  |  |
| Defibrating resin | Polyester resin 1 of Synthesis Example 2 |  |  | 18.7 | 16.7 | 16.7 | 100 | 150 |
| Total of compound having reactive double-bond group and hydroxyl value of 10 KOHmg/g or less, and defibrating resin | | 66.7 | 66.7 | 66.7 | 66.7 | 33.4 | 300 | 150 |
| Moisture content in the system (including the moisture in cellulose) | | 5.0 | 4.9 | 3.2 | 30 | 4.5 | 5.2 | 5.1 |
| Refined state of cellulose | | Poor | Poor | Acceptable | Poor | Acceptable | Poor | Good |

Example 6

Molded Body Producing Method

The cellulose nanofiber-containing resin composition 1 obtained in Example 1 was measured for moisture content. The moisture content was 4.3 parts by mass with respect to 100 parts by mass of the amount of the cellulose nanofiber converted on the assumption that the percentage moisture of the cellulose nanofiber is 0%. 8.55 g of the cellulose nanofiber-containing resin composition 1 and 100.00 g of Diovar® HTP-460 (methacrylic resin manufactured by DIC Corporation) were mixed, and dispersed at 1,000 rpm for 5 min using a TK Auto Homodisper (manufactured by Tokushu Kikai Kogyo Co., Ltd.). After adding and mixing 0.5 parts of 6% cobalt naphthenate, 1 part of a promoter RP-191 (manufactured by DHM), and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

shutoff mode. The same measurement was performed in Examples 7 and 8 and Comparative Example 8.

Example 7

Molded Body Producing Method

The cellulose nanofiber-containing resin composition 5 obtained in Example 5 was measured for moisture content. The moisture content was 22.8 parts by mass with respect to 100 parts by mass of the amount of the cellulose nanofiber converted on the assumption that the percentage moisture of the cellulose nanofiber is 0%. The cellulose nanofiber-containing resin composition 5 was dried overnight with a 50° C. drier. The dried cellulose nanofiber-containing resin composition 5 was measured for moisture content. The moisture content was 5.5 parts by mass with respect to 100 parts by mass of the amount of the cellulose nanofiber converted on the assumption that the percentage moisture of the cellulose nanofiber is 0%. 8.61 g of the dried cellulose nanofiber-containing resin composition 5, and 100.00 g of Diovar® HTP-460 were mixed, and dispersed at 1,000 rpm for 5 min using a TK Auto Homodisper (manufactured by Tokushu Kikai Kogyo Co., Ltd.). After adding and mixing 0.5 parts of 6% cobalt naphthenate, 1 part of a promoter RP-191 (DHM) and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Example 8

Molded Body Producing Method

The cellulose nanofiber-containing resin composition 2 obtained in Example 2 was measured for moisture content. The moisture content was 4.8 parts by mass with respect to 100 parts by mass of the amount of the cellulose nanofiber converted on the assumption that the percentage moisture of the cellulose nanofiber is 0%. 8.57 g of the cellulose nanofiber-containing resin composition 2, and 100.00 g of Diovar® HTP-460 were mixed, and dispersed at 1,000 rpm for 5min using a TK Auto Homodisper (manufactured by Tokushu Kikai Kogyo Co., Ltd.). After adding and mixing 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Comparative Example 8

Molded Body Producing Method

The cellulose nanofiber-containing resin composition 6 obtained in Comparative Example 7 was measured for moisture content. The moisture content was 4.4 parts by mass with respect to 100 parts by mass of the amount of the cellulose nanofiber converted on the assumption that the percentage moisture of the cellulose nanofiber is 0%. 12.72 g of the cellulose nanofiber-containing resin composition 6 and 100.00 g of Diovar® HTP-460 were mixed, and dispersed at 1,000 rpm for 5 min using a TK Auto Homodisper (manufactured by Tokushu Kikai Kogyo Co., Ltd.). After adding and mixing 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Comparative Example 9

Molded Body Producing Method 0.5 parts of 6% Cobalt naphthenate, 1 part of a promoter RP-191, and 2 parts of 50% BPO were added, and mixed with 100.00 g of Diovar HTP-460. After being degassed with a vacuum desiccator, the mixture was poured into a mold, and heated at 80° C. for 6 h to obtain a 3 mm-thick molded plate . From the molded plate, a JIS K 6251 dumbbell-shaped test piece for tensile testing was prepared.

Comparative Example 10

Molded Body Producing Method 100.00 g of Diovar HTP-460, 2.5 g of the urethane methacrylate resin composition 1 synthesized in Synthesis Example 1, and 0.83 g of the polyester resin 1 synthesized in Synthesis Example 2 were mixed, and dispersed at 1,000 rpm for 5 min with a TK Auto Homodisper (manufactured by Tokushu Kikai Kogyo Co., Ltd.). After adding 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Comparative Example 11

Molded Body Producing Method 100.00 g of Diovar HTP-460, 2.5 g of EO-TMPTA, and 0.83 g of the polyester resin 1 synthesized in Synthesis Example 2 were mixed, and dispersed at 1,000 rpm for 5 min with a TK Auto Homodisper (manufactured by Tokushu Kikai Kogyo Co., Ltd.). After adding 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Comparative Example 12

Molded Body Producing Method 100.00 g of Diovar HTP-460, and 7.5 g of the polyester resin 1 synthesized in Synthesis Example 2 were mixed, and dispersed at 1,000 rpm for 5 min with a TK Auto Homodisper (manufactured by Tokushu Kikai Kogyo Co., Ltd.). After adding 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

[Method of Tensile Testing]

A tensile test was performed at a rate of 50 mm/min according to JIS K 6251.

[Surface Bleeding Evaluation]

The test piece surface was inspected with the naked eye for any bleeding in the defibrating resin. The samples were evaluated as "Good" when bleeding was not observable, and "Poor" when bleeding was observed.

Table 2 shows the test results for the dumbbell-shaped test pieces for tensile testing of Examples 6 to 8 and Comparative Examples 8 to 12, and the results of the surface bleeding evaluation for these Examples and Comparative Examples.

TABLE 2

| | | EX. 6 | EX. 7 | EX. 8 | COM. EX. 8 | COM. EX. 9 | COM. EX. 10 | COM. EX. 11 | COM. EX. 12 |
|---|---|---|---|---|---|---|---|---|---|
| | Diluent | HTP-460 | HTP-460 | HTP-460 | HTP-460 | HTP-460 | HTP-460 | HTP-460 | HTP-460 |
| Cellulose nanofiber-containing composition (C) | | EX. 1 | EX. 5 | EX. 2 | COM. EX. 7 | | | | |
| Proportions | HTP-460 | 100 | 100 | 100 | 100 | 100 | 100 | 100 | 100 |
| | Cellulose nanofiber | 5 | 5 | 5 | 5 | | | | |
| | Urethane methacrylate resin 1 of Synthesis Example 1 | 2.5 | 2.5 | | | | | 2.5 | |
| | EO-TMPTA | | | 2.5 | | | | | 2.5 |
| | Polyester resin 1 of Synthesis Example 2 | 0.83 | 0.83 | 0.83 | 7.5 | | 0.83 | 0.83 | 7.5 |
| | 6% Cobalt naphthenate | 0.5 | 0.5 | 0.5 | 0.5 | 0.5 | 0.5 | 0.5 | 0.5 |
| | PR-191 | 1 | 1 | 1 | 1 | 1 | 1 | 1 | 1 |
| | 50% BPO | 2 | 2 | 2 | 2 | 2 | 2 | 2 | 2 |
| Tensile strength (MPa) | | 9.4 | 9.3 | 15.9 | 7.9 | 7.9 | 7.0 | 13.6 | 7.0 |
| Tensile elongation (%) | | 114 | 112 | 36 | 144 | 91 | 100 | 30 | 100 |
| Surface bleeding | | Good | Good | Good | Poor | Good | Good | Good | Poor |

INDUSTRIAL APPLICABILITY

The present invention enables refining cellulose using a cellulose nanofiber-containing resin composition producing method that includes refining cellulose in a mixture containing a compound having a reactive double-bond group and a hydroxyl value of 10 KOHmg/g or less, and a defibrating resin as essential components, instead of in water or organic solvent, wherein the cellulose has a moisture content of 4 to 25 parts by mass with respect to 100 parts by mass of the amount of the cellulose converted on the assumption that the percentage moisture of the cellulose is 0%. A cellulose nanofiber-containing resin composition obtained by using the method can easily be combined with a compound having a reactive double-bond group and a hydroxyl value of 10 KOHmg/g or less, and the product resin composition can directly be used to produce a molded body, and contains considerably small amounts of uncured defibrating resin that acts as a plasticizer during the curing. The invention thus enables producing a high-strength molded body with the effects of the cellulose nanofibers, without deteriorating the product quality. This makes the present invention highly useful in industry.

The invention claimed is:

1. A method for producing a cellulose nanofiber-containing resin composition, comprising:
    refining cellulose in a mixture containing a compound having a reactive double-bond group and a hydroxyl value of 10 KOHmg/g or less and a defibrating resin, wherein the cellulose has a moisture content of 4 to 25 parts by mass with respect to 100 parts by mass of the amount of the cellulose converted on the assumption that the percentage moisture of the cellulose is 0%.

2. The method for producing a cellulose nanofiber-containing resin composition according to claim 1,
    wherein the amount of the defibrating resin is 10 parts by mass or more with respect to 100 parts by mass of the amount of the cellulose converted on the assumption that the percentage moisture of the cellulose is 0%, and
    the mixture containing a compound having a reactive double-bond group and a hydroxyl value of 10 KOHmg/g or less and a defibrating resin is 40 parts by mass to 250 parts by mass with respect to 100 parts by mass of the amount of the cellulose converted on the assumption that the percentage moisture of the cellulose is 0%.

3. The method for producing a cellulose nanofiber-containing resin composition according to claim 1, further comprising:
    diluting the cellulose nanofiber-containing resin composition with a compound having a reactive double-bond group.

4. The method for producing a cellulose nanofiber-containing resin composition according to claim 3, further comprising:
    incorporating a polymerization initiator.

5. A molded body produced by molding the cellulose nanofiber-containing resin composition obtained according to the method of claim 4.

6. The method for producing a cellulose nanofiber-containing resin composition according to claim 2, further comprising:
    diluting the cellulose nanofiber-containing resin composition with a compound having a reactive double-bond group.

* * * * *